Patented Mar. 14, 1950

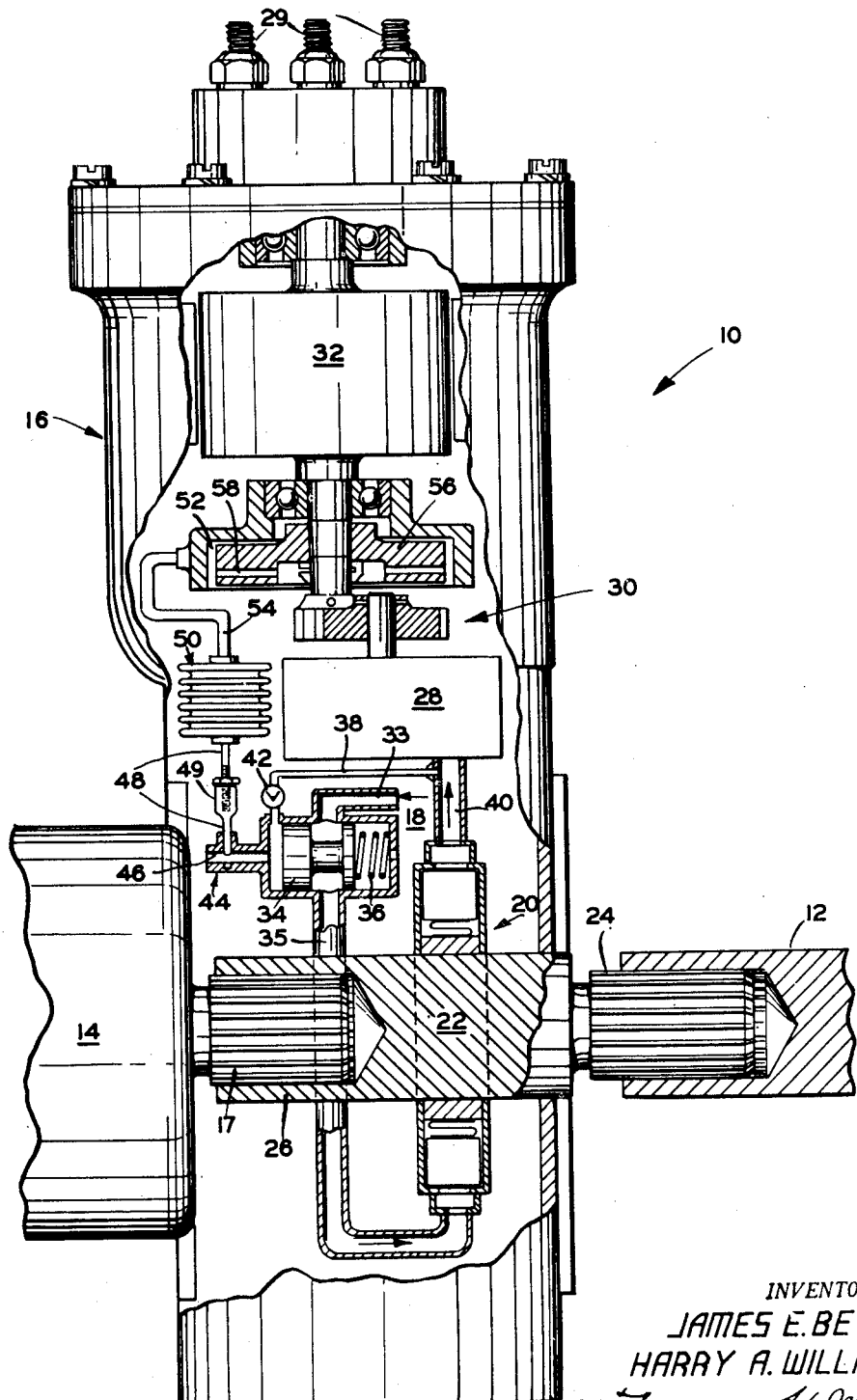

2,500,655

UNITED STATES PATENT OFFICE 2,500,655

CONSTANT SPEED AND FREQUENCY DRIVE

James Emil Bevins, Ramsey, and Harry Alfred Williams, Allendale, N. J., assignors to Bendix Aviation Corporation, Teterboro, N. J., a corporation of Delaware Application July 10, 1947, Serial No. 760,064

6 Claims. (Cl. 290—4)

This invention relates to constant speed and frequency devices operable by variable speed drives, and particularly, as in the example given, to a "stand-by" constant frequency power source for fighter planes.

Among the objects of the invention are to provide an auxiliary source of power supply for airplane instruments in the event of failure of a main power supply, and to provide a compact unit which may be mounted readily on an airplane engine.

Another object is to provide a unit as aforesaid which is particularly adapted for mounting between the airplane engine and its direct current generator, and to provide alternating current at a regulated frequency of a given number of cycles per second.

Another object, in association with a unit comprising a pump, a hydraulic motor driven by the pump, and a device adapted to be driven by the motor, is to provide a valve controlling the flow of liquid to the pump, means biasing the valve in one direction to vary such flow, conduit means from the pump outlet providing pressure biasing the valve oppositely, means for bleeding the conduit means, and fluid-actuated means responsive to predetermined operation of the motor driven device for actuating the control means.

Another object is to provide a device of the above indicated character which is simple and durable in construction, economical to manufacture, and effective in its operation.

The above and other objects and features of the invention will appear more fully hereinafter from a consideration of the following description taken in connection with the accompanying drawing wherein one embodiment of the invention is illustrated by way of example.

In the drawing the single figure is a composite view showing an outline of a unit of the invention including elements as actually constructed, and having other elements superposed diagrammatically thereon.

Referring to the drawing, a unit 10 is adapted for insertion between an engine element 12 and a direct-current generator 14 of an aircraft.

The unit 10 comprises a housing 16 providing a sump 18, a vane pump 20 in the housing including a shaft 22 having an external spline end 24 outside the housing 16 for connection to the engine element 12, and an internal spline end 26 in the housing 16 for connection to a shaft 17 of the generator 14.

A hydraulic motor 28, in the housing 16, is driven by the pump 20, and the motor 28 operates through speed change means 30 in the housing 16 to drive an alternator 32 at a speed higher than the speed of the motor 28. Alternating current is delivered through terminals 29.

A servo valve or piston 34, in the housing 16, controls the flow of liquid from the sump 18 through a conduit 33 to the valve and, from the latter through a conduit 35 to the pump 20. The valve includes spring means 36 biasing the piston in one direction, to the left, as shown, to vary such flow.

Conduit means 38, in the housing 16, between an outlet conduit 40 of the pump 20 and the servo valve 34, provides fluid pressure against the valve piston opposing the bias of the spring 36. Metering orifice means 42, in the housing 16 and operable from the exterior thereof, is provided in the conduit means 38 for regulating the flow from the pump outlet 40 to the servo valve 34.

Means 44, in the housing 16 for bleeding the conduit means 38, includes a bleeder orifice 46, opening to the sump and a control valve needle or pilot rod 48 for the orifice 46. Fluid-responsive actuating means, which in this instance is in the form of a bellows 50, is provided in the housing 16 for the valve rod 48, which includes means 49 whereby the length of the rod may be adjusted. A pressure chamber 52, in the housing 16, is connected, as by a conduit 54, to the fluid-responsive actuating means or bellows 50, and is adapted to have pressure therein built up by a centrifugal governor pump 56 in the housing 16 driven at the speed of the alternator 32 for draining liquid from inside the housing 16 and forcing it through radial passages 58 to the chamber 52.

In operation, the pump shaft 22 is rotated by the engine at variable speeds. The shaft carries the rotor of the vane pump 20, which delivers oil in varying amounts to the hydraulic motor 28. The demand from the pump 20 is regulated by the speed of the hydraulic motor 28 which, in turn, drives the centrifugal pump 56, the function of which is to supply oil at pressures proportional to the speed of the motor. The pressure created by the centrifugal pump 56 expands the bellows 50 which operates needle valve 48 in the means 44. The needle valve 48 controls the flow through the orifice 46 and thereby regulates the position of the servo valve 34 which restricts the inlet 35 to the vane pump 20, thereby allowing sufficient oil supply to the oil motor to run the latter at a constant speed. In order to make the servo valve 34 operative, servo pressure is tapped from pump discharge 40, through the conduit 38, and is metered to one end of the servo piston through the metering orifice 42. The spring 38 moves the servo piston 34 in the opposite direction. Speed adjustments are accomplished by adjusting the means 49 to vary the length of the needle valve 48 carried by the bellows 50.

Although only one embodiment of the invention has been illustrated and described, various changes in the form and relative arrangements of the parts may be made to suit requirements.

What is claimed is:

1. A unit, adapted for insertion between an engine and a direct-current generator of an aircraft, the unit comprising a housing providing a sump, a pump in the housing including a shaft having an external spline end outside the housing for connection to the engine and an internal spline end in the housing for connection to the generator, a hydraulic motor in the housing driven by the pump, speed-change means in the housing, an alternator in the housing driven through said speed-change means by the motor at a speed higher than the motor speed, a valve in the housing for controlling the flow of liquid from the sump to the pump and including spring means biasing the valve in one direction, conduit means in the housing between the pump outlet and the valve providing fluid pressure opposing the spring bias, means in the housing for regulating flow in said conduit means, means in the housing for bleeding said conduit means including a bleeder orifice and a control valve for the orifice, fluid-responsive control-valve actuating means in the housing, a pressure chamber in the housing connected to said responsive means, and centrifugal governor pump means in the housing driven at the alternator speed for drawing liquid from the sump and connected to said chamber for building up pressure in the chamber to cause operation of said first valve toward closed position on increase in speed of said centrifugal governor pump means, and toward open position on decrease in speed of said centrifugal governor pump means.

2. In a unit comprising a sump, a pump adapted to be driven by a variable speed driving means, a hydraulic motor driven by the pump, speed-change means, and an alternator driven through said speed-change means by the motor at a speed higher than the motor speed, the combination of means for maintaining the speed of the alternator substantially constant irrespective of variations in the speed of said driving means including a valve for controlling the flow of liquid from the sump to the inlet side of the pump, spring means biasing said valve in one direction, conduit means connected between the outlet side of the pump and the valve providing fluid pressure biasing the valve oppositely to said spring means, means for regulating flow in said conduit means, means for bleeding said conduit means including a bleeder orifice and a pilot control valve for the orifice, fluid-responsive pilot-valve actuating means, a pressure chamber connected to said responsive means, and centrifugal governor pump means driven at the alternator speed drawing liquid from the sump and connected to said chamber for building up pressure in the chamber to cause operation of said first valve toward closed position on increase in speed of said centrifugal governor pump means, and toward open position on decrease in speed of said centrifugal governor pump means.

3. In a unit comprising a sump, a pump adapted to be driven by a variable speed driving means, a hydraulic motor driven by the pump, and an alternator driven by the motor, the combination of means for maintaining the speed of the alternator substantially constant irrespective of variations in the speed of said driving means including a valve for controlling the flow of liquid from the sump to the inlet side of the pump, spring means biasing said valve in one direction, conduit means connected between the outlet side of the pump and the valve providing fluid pressure biasing the valve oppositely to said spring means, means for regulating flow in said conduit means, means for bleeding said conduit means including a bleeder orifice and a pilot control valve for the orifice, fluid-responsive pilot-valve actuating means, a pressure chamber connected to said responsive means, and centrifugal governor pump means driven by the motor for drawing liquid from the sump and connected to said chamber for building up pressure in the chamber to cause operation of said first valve toward closed position on increase in speed of said centrifugal governor pump means, and toward open position on decrease in speed of said centrifugal governor pump means.

4. In a unit comprising a pump adapted to be driven by variable speed driving means, a hydraulic motor driven by the pump, and an alternator driven by the motor, the combination of means for maintaining the speed of the alternator substantially constant including a valve for controlling the flow of liquid to the pump inlet, spring means biasing said valve in one direction, conduit means between the pump outlet and the valve providing pressure biasing the valve in the opposite direction, means including a bleeder orifice from said conduit means and an orifice control valve, fluid-responsive orifice valve actuating means, a pressure chamber connected to said responsive means, and governor pump means driven by the motor and adapted to build up pressure in said chamber, to cause operation of said first valve toward closed position on increase in speed of said governor pump means, and toward open position on decrease in speed of said governor pump means.

5. In a unit comprising a pump, a hydraulic motor driven by the pump, and an alternator driven by the motor, the combination of a valve controlling the flow of liquid to the pump, means biasing said valve in one direction, conduit means from the pump outlet providing pressure biasing the valve oppositely, means for bleeding said conduit means, control means for said bleeding means, and fluid actuated means responsive to the speed of the alternator for actuating said control means, to cause operation of said valve toward closing position on increase of speed of the alternator and toward open position on decrease of speed of the alternator.

6. In a unit comprising a pump, a hydraulic motor driven by the pump, and a device adapted to be driven by the motor, the combination of a valve controlling the flow of liquid to the pump, means biasing said valve in one direction, conduit means from the pump outlet providing pressure biasing the valve oppositely, means for bleeding said conduit means, control means for said bleeding means, and fluid actuated means responsive to variation in speed of said device for actuating said control means, to cause operation of said valve toward closing position on increase of speed of said device and toward open position on decrease of speed of said device.

JAMES EMIL BEVINS.
HARRY ALFRED WILLIAMS.

(References on following page)

REFERENCES CITED

The following references are of record in the file of this patent:

UNITED STATES PATENTS

| Number | Name | Date |
|---|---|---|
| 743,484 | Gerdes | Nov. 10, 1903 |
| 894,588 | Brodton | July 28, 1908 |
| 901,117 | McManus | Oct. 13, 1908 |
| 1,787,930 | Fletcher | Jan. 6, 1931 |
| 2,079,724 | Van Ranst | May 11, 1937 |
| 2,179,962 | Scott | Nov. 14, 1939 |
| 2,230,717 | De Lancey | Feb. 4, 1941 |
| 2,255,420 | Graham | Sept. 9, 1941 |
| 2,291,011 | Vickers | July 28, 1942 |
| 2,376,142 | Hoffman et al. | May 15, 1945 |
| 2,376,143 | Edwards | May 15, 1945 |

FOREIGN PATENTS

| Number | Country | Date |
|---|---|---|
| 139,165 | Great Britain | Dec. 30, 1920 |
| 201,235 | Great Britain | July 26, 1923 |